(12) United States Patent
Ratnakar Aravind

(10) Patent No.: US 8,154,972 B2
(45) Date of Patent: Apr. 10, 2012

(54) SYSTEMS AND METHODS FOR HARD DISK DRIVE DATA STORAGE INCLUDING REDUCED LATENCY LOOP RECOVERY

(75) Inventor: Nayak Ratnakar Aravind, Lancaster, PA (US)

(73) Assignee: LSI Corporation, Milpitas, CA (US)

( * ) Notice: Subject to any disclaimer, the term of this patent is extended or adjusted under 35 U.S.C. 154(b) by 150 days.

(21) Appl. No.: 12/491,179

(22) Filed: Jun. 24, 2009

(65) Prior Publication Data

US 2010/0329096 A1 Dec. 30, 2010

(51) Int. Cl.
G11B 20/10 (2006.01)

(52) U.S. Cl. ............... 369/59.21; 369/44.32; 369/44.29; 369/47.17; 369/47.35; 369/47.19; 369/47.26; 369/44.35

(58) Field of Classification Search ............... 369/59.21, 369/44.32, 44.29, 47.17, 47.35, 47.19, 47.26, 369/44.35
See application file for complete search history.

(56) References Cited

U.S. PATENT DOCUMENTS

| | | | |
|---|---|---|---|
| 3,973,182 A | 8/1976 | Kataoka |
| 3,973,183 A | 8/1976 | Kataoka |
| 4,024,571 A | 5/1977 | Dischert et al. |
| 4,777,544 A | 10/1988 | Brown et al. |
| 5,130,866 A | 7/1992 | Klaassen et al. |
| 5,237,325 A | 8/1993 | Klein et al. |
| 5,278,703 A | 1/1994 | Rub et al. |
| 5,309,357 A | 5/1994 | Stark et al. |
| 5,341,249 A | 8/1994 | Abbott et al. |
| 5,377,058 A | 12/1994 | Good et al. |
| 5,521,948 A | 5/1996 | Takeuchi |
| 5,523,902 A | 6/1996 | Pederson |
| 5,668,679 A | 9/1997 | Swearingen et al. |
| 5,696,639 A | 12/1997 | Spurbeck et al. |
| 5,781,129 A | 7/1998 | Schwartz et al. |

(Continued)

FOREIGN PATENT DOCUMENTS

WO WO 2009/142620 11/2009

OTHER PUBLICATIONS

Annampedu, V. and Aziz, P.M., "Adaptive Algorithms for Asynchronous Detection of Coded Servo Signals Based on Interpolation", IEEE Trans. on Mag., vol. 41, No. 10, Oct. 2005.

(Continued)

*Primary Examiner* — Wayne Young
*Assistant Examiner* — Linh Nguyen
(74) *Attorney, Agent, or Firm* — Hamilton DeSanctis & Cha

(57) ABSTRACT

Various embodiments of the present invention provide systems and methods for data processing. As an example, a data processing circuit is discussed that includes a summation circuit, a data detector circuit, an error feedback circuit, and an error calculation circuit. The summation circuit subtracts a low frequency offset feedback from an input signal to yield a processing output. The data detector circuit applies a data detection algorithm to a derivative of the processing output and provides an ideal output. The error feedback circuit includes a conditional subtraction circuit that conditionally subtracts an interim low frequency offset correction signal from a delayed version of the derivative of the processing output to yield an interim factor. The error calculation circuit generates an interim low frequency offset correction signal based at least in part on the interim factor and a derivative of the ideal output. In such embodiments, the low frequency offset feedback is derived from the interim low frequency offset correction signal.

20 Claims, 4 Drawing Sheets

U.S. PATENT DOCUMENTS

| | | | |
|---|---|---|---|
| 5,798,885 | A | 8/1998 | Saiki et al. |
| 5,835,295 | A | 11/1998 | Behrens |
| 5,844,920 | A | 12/1998 | Zook et al. |
| 5,848,048 | A * | 12/1998 | Tachibana ............... 369/47.26 |
| 5,852,524 | A | 12/1998 | Glover et al. |
| 5,986,830 | A | 11/1999 | Hein |
| 5,987,562 | A | 11/1999 | Glover |
| 6,009,549 | A | 12/1999 | Bliss et al. |
| 6,023,383 | A | 2/2000 | Glover et al. |
| 6,069,583 | A | 5/2000 | Silvestrin et al. |
| 6,081,397 | A | 6/2000 | Belser |
| 6,111,712 | A | 8/2000 | Vishakhadatta et al. |
| 6,208,478 | B1 | 3/2001 | Chiu et al. |
| 6,278,591 | B1 | 8/2001 | Chang et al. |
| 6,400,518 | B1 | 6/2002 | Bhaumik et al. |
| 6,404,829 | B1 | 6/2002 | Sonu |
| 6,441,661 | B1 | 8/2002 | Aoki et al. |
| 6,490,110 | B2 | 12/2002 | Reed et al. |
| 6,493,162 | B1 | 12/2002 | Fredrickson |
| 6,519,102 | B1 | 2/2003 | Smith et al. |
| 6,530,060 | B1 | 3/2003 | Vis et al. |
| 6,603,622 | B1 | 8/2003 | Christiansen et al. |
| 6,606,048 | B1 | 8/2003 | Sutardja |
| 6,633,447 | B2 | 10/2003 | Franck et al. |
| 6,646,822 | B1 | 11/2003 | Tuttle et al. |
| 6,657,802 | B1 | 12/2003 | Ashley et al. |
| 6,775,529 | B1 | 8/2004 | Roo |
| 6,788,484 | B2 | 9/2004 | Honma |
| 6,813,108 | B2 | 11/2004 | Annampedu et al. |
| 6,816,328 | B2 | 11/2004 | Rae |
| 6,839,014 | B2 | 1/2005 | Uda |
| 6,856,183 | B2 | 2/2005 | Annampedu |
| 6,876,511 | B2 | 4/2005 | Koyanagi |
| 6,912,099 | B2 | 6/2005 | Annampedu et al. |
| 6,963,521 | B2 | 11/2005 | Hayashi |
| 6,999,257 | B2 | 2/2006 | Takeo |
| 6,999,264 | B2 | 2/2006 | Ehrlich |
| 7,002,767 | B2 | 2/2006 | Annampedu et al. |
| 7,038,875 | B2 | 5/2006 | Lou et al. |
| 7,072,137 | B2 | 7/2006 | Chiba |
| 7,082,005 | B2 | 7/2006 | Annampedu et al. |
| 7,092,462 | B2 | 8/2006 | Annampedu et al. |
| 7,116,504 | B1 | 10/2006 | Oberg |
| 7,126,776 | B1 | 10/2006 | Warren, Jr. et al. |
| 7,136,250 | B1 | 11/2006 | Wu et al. |
| 7,154,689 | B1 | 12/2006 | Shepherd et al. |
| 7,167,328 | B2 | 1/2007 | Annampedu et al. |
| 7,180,693 | B2 | 2/2007 | Annampedu et al. |
| 7,187,739 | B2 | 3/2007 | Ma |
| 7,191,382 | B2 | 3/2007 | James et al. |
| 7,193,544 | B1 | 3/2007 | Fitelson et al. |
| 7,193,798 | B2 | 3/2007 | Byrd et al. |
| 7,199,961 | B1 | 4/2007 | Wu et al. |
| 7,203,013 | B1 | 4/2007 | Han et al. |
| 7,206,146 | B2 | 4/2007 | Flynn et al. |
| 7,230,789 | B1 | 6/2007 | Brunnett et al. |
| 7,253,984 | B1 | 8/2007 | Patapoutian et al. |
| 7,262,928 | B1 * | 8/2007 | Oberg et al. ............... 360/39 |
| 7,301,717 | B1 | 11/2007 | Lee et al. |
| 7,308,057 | B1 | 12/2007 | Patapoutian |
| 7,362,536 | B1 | 4/2008 | Liu et al. |
| 7,375,918 | B1 | 5/2008 | Shepherd et al. |
| 7,411,531 | B2 | 8/2008 | Aziz et al. |
| 7,420,498 | B2 | 9/2008 | Barrenscheen |
| 7,423,827 | B2 | 9/2008 | Neville et al. |
| 7,446,690 | B2 | 11/2008 | Kao |
| 7,499,238 | B2 | 3/2009 | Annampedu |
| 7,558,177 | B2 * | 7/2009 | Ogura et al. ............... 369/59.22 |
| 7,620,101 | B1 | 11/2009 | Jenkins |
| 8,018,360 | B2 * | 9/2011 | Nayak ........................... 341/118 |
| 2002/0001151 | A1 | 1/2002 | Lake |
| 2002/0150179 | A1 | 10/2002 | Leis et al. |
| 2002/0176185 | A1 | 11/2002 | Fayeulle et al. |
| 2002/0181377 | A1 | 12/2002 | Nagata et al. |
| 2003/0095350 | A1 | 5/2003 | Annampedu et al. |
| 2005/0046982 | A1 | 3/2005 | Liu et al. |
| 2005/0157415 | A1 | 7/2005 | Chiang et al. |
| 2005/0243455 | A1 | 11/2005 | Annampedu |
| 2007/0071152 | A1 | 3/2007 | Chen et al. |
| 2007/0104300 | A1 | 5/2007 | Esumi et al. |
| 2007/0183073 | A1 | 8/2007 | Sutardja et al. |
| 2007/0230015 | A1 | 10/2007 | Yamashita et al. |
| 2007/0263311 | A1 | 11/2007 | Smith |
| 2007/0280059 | A1 * | 12/2007 | Cheng et al. ............... 369/44.25 |
| 2008/0080082 | A1 | 4/2008 | Erden et al. |
| 2008/0212715 | A1 | 9/2008 | Chang |
| 2008/0266693 | A1 | 10/2008 | Bliss et al. |
| 2009/0002862 | A1 | 1/2009 | Park et al. |
| 2009/0142620 | A1 | 6/2009 | Yamamoto et al. |

OTHER PUBLICATIONS

Aziz & Annampedu, "Interpolation Based Maximum-Likelihood(ML) Detection of Asynchronous Servo Repeatable Run Out (RRO) Data", IEEE Int. Mag. Con., vol. 42, No. 10, Oct. 2006.

* cited by examiner

SYSTEMS AND METHODS FOR HARD DISK DRIVE DATA STORAGE INCLUDING REDUCED LATENCY LOOP RECOVERY

BACKGROUND OF THE INVENTION

The present inventions are related to systems and methods for storing information, and more particularly to systems and methods for reducing loop recovery latency in a storage device.

A typical data processing system receives an analog input signal that is amplified using a variable gain amplifier. The amplified signal is converted to a digital signal and processed using one of a variety of digital processing techniques. Feedback from the digital processing is provided back to a summation element to adjust the low frequency offset. As bit periods have decreased, faster and faster data processing has been developed. Because of this, the feedback latency has grown in terms of the number of bit periods. This latency negatively effects loop stability.

Turning to FIG. 1, a data detection system 100 including a prior art low frequency offset feedback loop is shown. Data detection system 100 includes a variable gain amplifier 110 that receives an analog input signal 105, and provides an amplified output 112. Amplified output 112 is provided to a summation element 199 that sums an analog feedback signal 197 with amplified output 112 to provide a sum output 115. Analog feedback signal 197 is a low frequency offset correction that is more fully described below, and sum output 115 is amplified output 112 less the low frequency offset. Sum output 115 is provided to a magneto-resistive asymmetry correction circuit 120 that yields a corrected output 125. Corrected output 125 is filtered using a continuous time filter 130, and a resulting filtered output 135 is provided to an analog to digital converter 140. Analog to digital converter 140 provides a series of digital samples 145 corresponding to filtered output 135. The series of digital samples 145 are provided to a digital filter 150 that provides a digitally filtered output 155. A data detection algorithm is applied by a data detector 160 to digitally filtered output 155 to recover a $Y_{ideal}$ output 165.

$Y_{ideal}$ output 165 is provided to a partial response target filter 180 that conforms $Y_{ideal}$ to a partial response target and provides a target output 185. Digitally filtered output 155 is provided to a delay circuit 170 that provides a delayed signal 175 that corresponds to digitally filtered output 155 delayed in time sufficient to align it with target output 185. A summation element 192 subtracts target output 185 from delayed signal 175, and provides the result as an error signal 189. Error signal 189 is stored to an offset update register 190. The output of offset update register 190 is converted to analog feedback signal 197 using a digital to analog converter 195. As previously discussed, analog feedback signal 197 is provided to summation element 199 where it is subtracted from amplified output 112.

There can be a substantial latency between the time that summation element 199 provides sum output 115 and when analog feedback signal 197 corresponding to sum output 115 is available. As this latency grows to several bit periods, it can result in substantial loop instability as analog feedback signal 197 can be applied well after the condition it was intended to correct has resolved itself. Indeed, in some cases, analog feedback signal 197, rather than operating as a negative feedback may operate as a positive feedback accentuate an undesired operational condition.

Hence, for at least the aforementioned reasons, there exists a need in the art for advanced systems and methods for reduced latency data processing.

BRIEF SUMMARY OF THE INVENTION

The present inventions are related to systems and methods for storing information, and more particularly to systems and methods for reducing loop recovery latency in a storage device.

Various embodiments of the present invention provide storage devices that include a storage medium, a read/write head assembly, an analog processing circuit, and a digital processing circuit. The read/write head assembly is operable to access information stored on the storage medium and to transfer the information to an analog processing circuit. The analog processing circuit includes a summation circuit and an analog to digital converter. The summation circuit subtracts a low frequency offset feedback from a derivative of the information to yield a processing output. The analog to digital converter converts a derivative of the processing output to a series of digital samples. The digital processing circuit includes a data detector circuit, an error feedback circuit, an error calculation circuit, and a digital to analog converter. The data detector circuit applies a data detection algorithm to a derivative of the series of digital samples and provides an ideal output. The error feedback circuit includes a conditional subtraction circuit that conditionally subtracts an interim low frequency offset correction signal from a delayed version of the derivative of the series of digital samples to yield an interim factor. The error calculation circuit generates an interim low frequency offset correction signal based at least in part on the interim factor and a derivative of the ideal output. The digital to analog converter converts a derivative of the interim low frequency offset correction signal to yield the low frequency offset feedback.

In some instances of the aforementioned embodiments, the analog processing circuit further includes a magneto-resistive asymmetry correction circuit and a filter. The magneto-resistive asymmetry correction circuit receives the processing output and provides a corrected output, and the filter receives the corrected output and provides the derivative of the processing output. In various instances of the aforementioned embodiments, the digital processing circuit further includes a digital filter that receives the series of digital samples and provides the derivative of the series of digital samples.

In some instances of the aforementioned embodiments, the summation circuit is a first summation circuit, and the conditional subtraction circuit includes a delay circuit and a second summation circuit. The delay circuit provides a delayed version of the interim low frequency offset correction signal. The second summation circuit subtracts the delayed version of the interim low frequency offset correction signal from the interim low frequency offset correction signal to yield a compensation factor. In some cases, the aforementioned delay circuit is a first delay circuit, and the conditional subtraction circuit further includes a second delay circuit and a third summation circuit. The second delay circuit receives the derivative of the series of digital samples and provides the delayed version of the derivative of the series of digital samples. The third summation circuit subtracts the compensation factor from the delayed version of the interim low frequency offset correction signal to yield the interim factor.

In one or more instances of the aforementioned embodiments, the summation circuit is a first summation circuit, and the error calculation circuit includes a second summation circuit that subtracts the derivative of the ideal output from the interim factor to yield the interim low frequency offset correction signal. In particular instances of the aforementioned embodiments, the digital processing circuit further includes a multiplication circuit that multiplies the interim low frequency offset correction signal by a gain factor to yield the derivative of the interim low frequency offset correction signal. In some cases, the gain factor yields a loop gain of unity. In particular instances of the aforementioned embodiments, the error calculation circuit includes a partial response target circuit that receives the ideal output and yields the derivative of the ideal output.

Other embodiments of the present invention provide data processing circuits. Such data processing circuits include a summation circuit, a data detector circuit, an error feedback circuit, and an error calculation circuit. The summation circuit subtracts a low frequency offset feedback from an input signal to yield a processing output. The data detector circuit applies a data detection algorithm to a derivative of the processing output and provides an ideal output. The error feedback circuit includes a conditional subtraction circuit that conditionally subtracts an interim low frequency offset correction signal from a delayed version of the derivative of the processing output to yield an interim factor. The error calculation circuit generates an interim low frequency offset correction signal based at least in part on the interim factor and a derivative of the ideal output. In such embodiments, the low frequency offset feedback is derived from the interim low frequency offset correction signal.

Yet other embodiments of the present invention provide methods for reduced latency data processing. Such methods include providing a summation circuit; subtracting a low frequency offset feedback from an input signal to yield a processing output; applying a data detection algorithm to a derivative of the processing output to yield an ideal output; perform a conditional subtraction where an interim low frequency offset correction signal is subtracted from the derivative of the processing output to yield an interim factor during a limited period after the interim low frequency offset correction signal becomes available; and subtracting a derivative of the ideal output from the interim factor to yield the interim low frequency offset correction signal. The low frequency offset feedback is a derivative of the interim low frequency offset correction signal. In some instances of the aforementioned embodiments, the derivative of the processing output is a first derivative of the processing output, and the methods further include multiplying the interim low frequency offset correction signal by a gain factor to yield the derivative of the interim low frequency offset correction signal; performing an analog to digital conversion of a second derivative of the processing output to yield the first derivative of the processing output; and performing a digital to analog conversion of the derivative of the interim low frequency offset correction signal to yield the low frequency offset feedback.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present inventions are related to systems and methods for storing information, and more particularly to systems and methods for reducing loop recovery latency in a storage device.

Proper function of low frequency correction feedback loops is important to ensuring reasonable performance in read channel devices. Undesired low frequency errors may derive from an input signal and/or later analog processing circuitry used in processing the input signals. Various embodiments of the present invention provide low frequency offset correction circuits offering reduced latency when compared with existing offset correction circuits. Such embodiments rely on a summation element in the error computation path that allows for early utilization of a preliminary correction feedback signal, and for canceling out the preliminary correction feedback signal once the correction feedback signal has propagated through the loop. By preliminary utilization of the correction feedback signal, an undesirable low frequency offset may be corrected in a data processing system without requiring the latency of existing loops.

Figure 1:
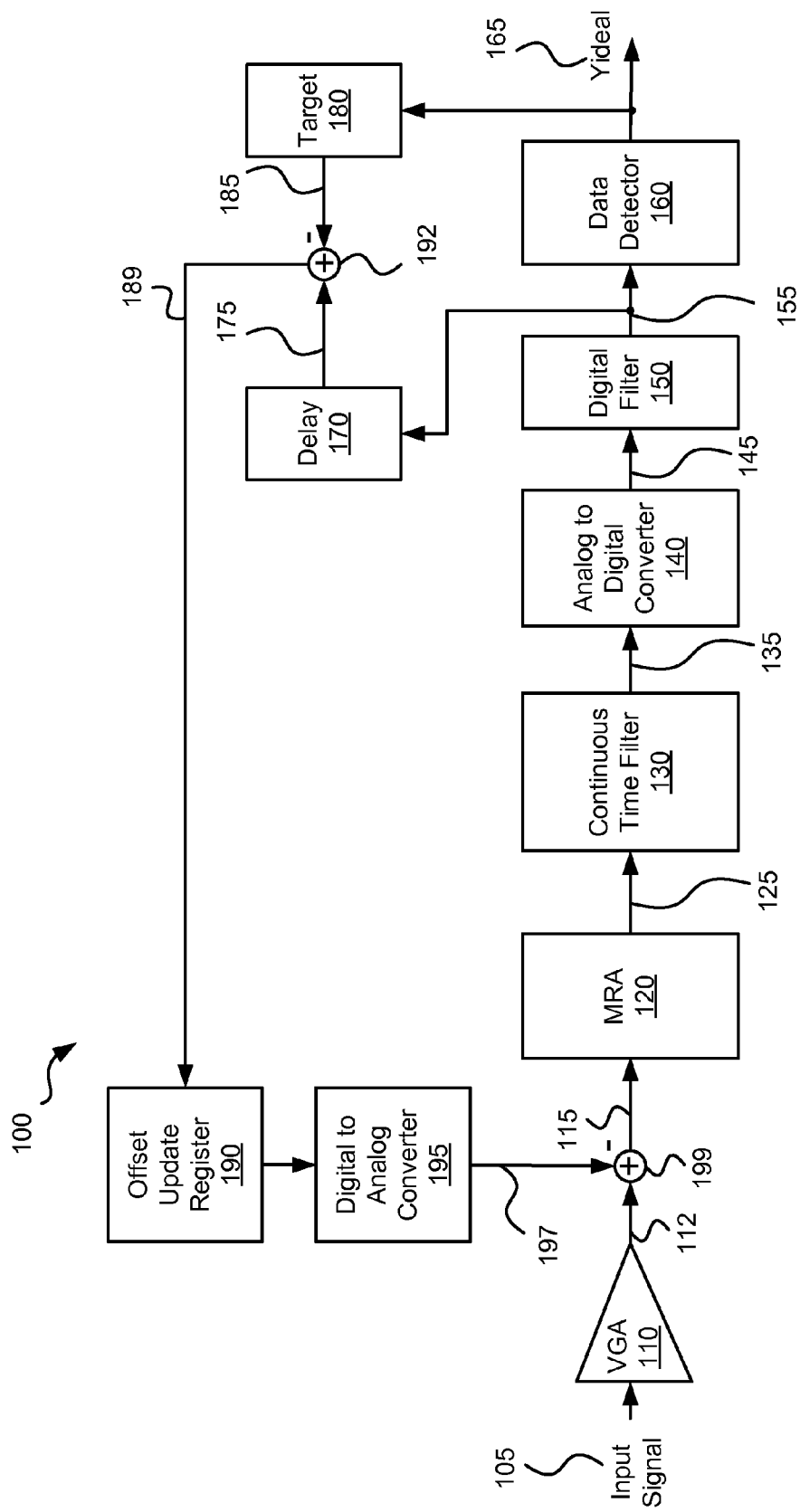
FIG. 1 depicts a data detection system including a prior art low frequency offset correction loop.
Figure 2:
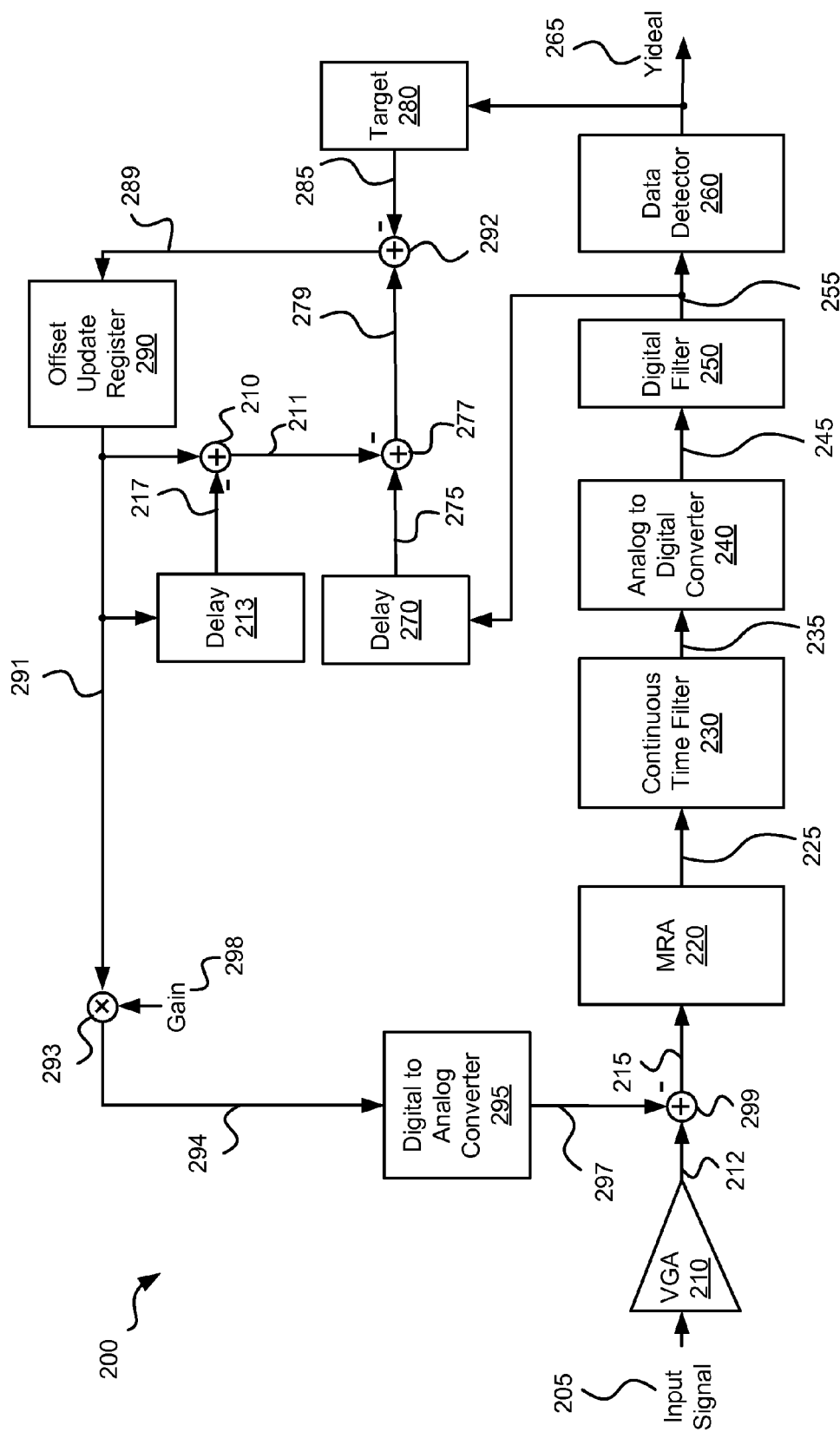
FIG. 2 depicts a data detection system including a reduced latency low frequency offset correction loop circuit in accordance with various embodiments of the present invention.

Turning to FIG. 2, a data detection system 200 including a reduced latency low frequency offset correction loop circuit is shown in accordance with various embodiments of the present invention. Data detection circuit 200 includes a variable gain amplifier 210 that receives an analog input signal 205, and provides a variably amplified output 212. Variable gain amplifier 210 may be any amplifier known in the art that is capable of providing a variably amplified output, with the amount of amplification being based upon a feedback signal (not shown). Based upon the disclosure provided herein, one of ordinary skill in the art will recognize a variety of variable gain amplifiers that may be used in relation to different embodiments of the present invention. Analog input signal 205 may be derived from a variety of sources. For example, where data detection system 200 is used to process data receives from a storage medium, analog input signal 205 may be derived from a read/write head assembly (not shown) that is disposed in relation to the magnetic storage medium (not shown). Based upon the disclosure provided herein, one of ordinary skill in the art will recognize a variety of sources for analog input signal 205.

Variably amplified output 212 is provided to a summation element that subtracts an analog feedback signal 297 from variably amplified output 212 to yield a processing output 215. As further disclosed below, analog feedback signal 297 corresponds to a low frequency offset correction value. Thus, processing output 215 represents variably amplified output 212 with the low frequency offset subtracted from it. Processing output 215 provided to a magneto-resistive asymmetry correction circuit 220 that yields a corrected output 225. Magneto-resistive asymmetry correction circuit 220 may be any correction circuit known in the art that is capable of mitigating the effects of MR asymmetry. Corrected output 225 is filtered using a continuous time filter 230. In some cases, continuous time filter 230 is an RC filter circuit as is known in the art that is tuned to operate as a band pass filter, a high pass filter, or a low pass filter. Based upon the disclosure provided herein, one of ordinary skill in the art will recognize a variety of filters that may be used as continuous time filter 230. It should also be noted that other analog processing circuits may be included with continuous time filter 230 depending upon the particular operation of the circuit. Based upon the disclosure provided herein, one of ordinary skill in the art will recognize a variety of analog processing circuitry that may be incorporated in data detection system 200.

A filtered output 235 is provided from continuous time filter 230 to an analog to digital converter 240. Analog to digital converter 240 may be any circuit known in the art that is capable of converting an analog input signal to a series of digital samples corresponding thereto. Analog to digital converter 240 samples filtered output 235 and provides a series of digital samples 245 corresponding to the magnitude of filtered output 235 at respective sampling points. Digital samples 245 are provided to a digital filter 250. Digital filter 250 provides a digitally filtered output 255. In some embodiments of the present invention, digital filter 250 is a digital finite impulse response filter as are known in the art. In one particular embodiment of the present invention, digital filter 250 is a ten tap digital finite impulse response filter.

Digitally filtered output 255 is provided to a data detector circuit 260. Data detector circuit 260 may be any detector/decoder known in the art. For example, data detector circuit 260 may incorporate a low density parity check decoder. As another example, data detector circuit 260 may incorporate a Viterbi algorithm decoder. Based upon the disclosure provided herein, one of ordinary skill in the art will recognize various detector circuits that may be used in relation to different embodiments of the present invention. Using digitally filtered output 255, data detector circuit 260 generates a $Y_{ideal}$ output 265. $Y_{ideal}$ output 265 represents signal input 205 with various error corrections applied by the data detection process. $Y_{ideal}$ output 265 is made available for downstream processing.

In addition, $Y_{ideal}$ output 265 is provided to a partial response target circuit 280 that conforms the output to a known target. Partial response target circuit 280 may be any target filter known in the art. In some embodiments of the present invention, partial response target circuit is a digital finite impulse response filter as are known in the art. In one particular embodiment of the present invention, partial response target circuit 280 is a three tap digital finite impulse response filter.

Partial response target circuit 280 provides a target output 285 to a summation element 292. Summation element 292 subtracts target output 285 from an adjusted output 279, and the result is provided as an error signal 289 that is stored to a offset update register 290. As discussed below, adjusted output 279 is derived from digitally filtered output 255. A preliminary low frequency offset correction output 291 is provided from offset update register 290. Preliminary low frequency offset correction output 291 is multiplied by a gain factor 288 using a multiplier circuit 293 yielding a low frequency offset correction output 294. Low frequency offset correction output 294 is converted to analog feedback signal 297 using a digital to analog converter 295. As mentioned above, analog feedback signal 297 is subtracted from variably amplified output 212 using summation element 299 to yield processing output 215.

The latency between the time that summation element 299 provides processing output 215 and when analog feedback signal 297 corresponding to variably amplified output 212 is available is reduced by applying an interim correction. The interim correction is achieved by feeding preliminary low frequency offset correction output 291 into the calculation of error signal 289 without waiting for the low frequency offset adjustment to propagate back through the loop via summation element 299. As an overview, the interim correction effectively subtracts preliminary low frequency offset correction output 291 from digitally filtered output 255 before comparison with target output 285 to yield error signal 289. As such, any low frequency offset correction corresponding to error signal 289 is quickly available for calculating a new value of error signal 289. This results in a reduction in latency between the availability of processing output 215 and the application of signals derived there from to error signal 289 (and thus preliminary low frequency offset correction output 291). As just some advantages, such a reduction in latency increases loop stability and allows for decreased bit periods along with correspondingly higher bandwidth through data detection system 200.

In particular, preliminary low frequency offset correction output 291 is provided to a delay circuit 213. A delayed output 217 from delay circuit 213 is provided to a summation element 210 where it is subtracted from preliminary low frequency offset correction output 291 to yield output 211. Delay circuit 213 applies a delay to preliminary low frequency offset correction output 291 that accounts for the time that it takes for preliminary low frequency offset correction output 291 to be reflected in error signal 289 via the path through summation element 299 (i.e., preliminary low frequency offset correction output 291 to digital to analog converter 295, magneto-resistive asymmetry correction circuit 220, continuous time filter 230, analog to digital converter 240, digital filter 250, data detector 260, partial response target circuit 280 and summation element 292). This loop is referred to herein as the slave loop. Delayed output 217 is provided to summation element 210 that subtracts a delayed version of preliminary low frequency offset correction output 291 from a current version of preliminary low frequency offset correction output 291 to yield a summation output 211. Summation output 211 is provided to a summation element 277 where it is subtracted from a delayed output 275 of digitally filtered output 255 provided by delay circuit 270. The result from summation element 277 is provided as an adjusted output 279. The loop from error signal 289 through offset update register 290, delay circuit 213, summation element 210, summation element 277 and summation element 292 is referred to herein as a master loop.

Summation output 211 initially reflects the value of preliminary low frequency offset correction output 291, but after the expiration of the delay period imposed by delay circuit 213, summation output 211 is zero as preliminary low frequency offset correction output 291 is subtracted out by summation element 210. The following pseudo-code describes the value of summation output 211:

```
If (t < T+delay period of Delay Circuit 213){
    Summation Output 211 = Preliminary Low Frequency Offset
    Correction Output 291
}
Else If (t >= T+delay period of Delay Circuit 213){
    Summation Output 211 = 0
}
```

In this way, any offset reflected by preliminary low frequency offset correction output 291 can be applied very quickly to the generation of error signal 289 as part of the master loop, but the offset reflected by preliminary low frequency offset correction output 291 that is applied to the slower slave loop can be cancelled when it is applied to error signal 289. This prevents double counting of preliminary low frequency offset correction output 291, while at the same time allowing for an interim use of preliminary low frequency offset correction output 291. In effect, preliminary low frequency offset correction output 291 is accelerated into error signal 289 via the master loop for the initial period where low frequency offset correction is still propagating through the slave loop, and then the actual affect of preliminary low frequency offset correction output 291 on summation element 299 is applied after it is propagated through the slave loop.

Digitally filtered output 255 is provided to a delay circuit 270 that provides a delayed filtered output signal 275. The period of delay imposed by delay circuit 270 corresponds to the time required for a signal to propagate through data detector 260 and partial response target circuit 280, less the amount of time required to propagate through summation element 277. By imposing this delay, adjusted output 279 is aligned in time with target output 285 (i.e., a corresponding digitally filtered output 255 is used to create both target output 285 and adjusted output 279.

Figure 3:
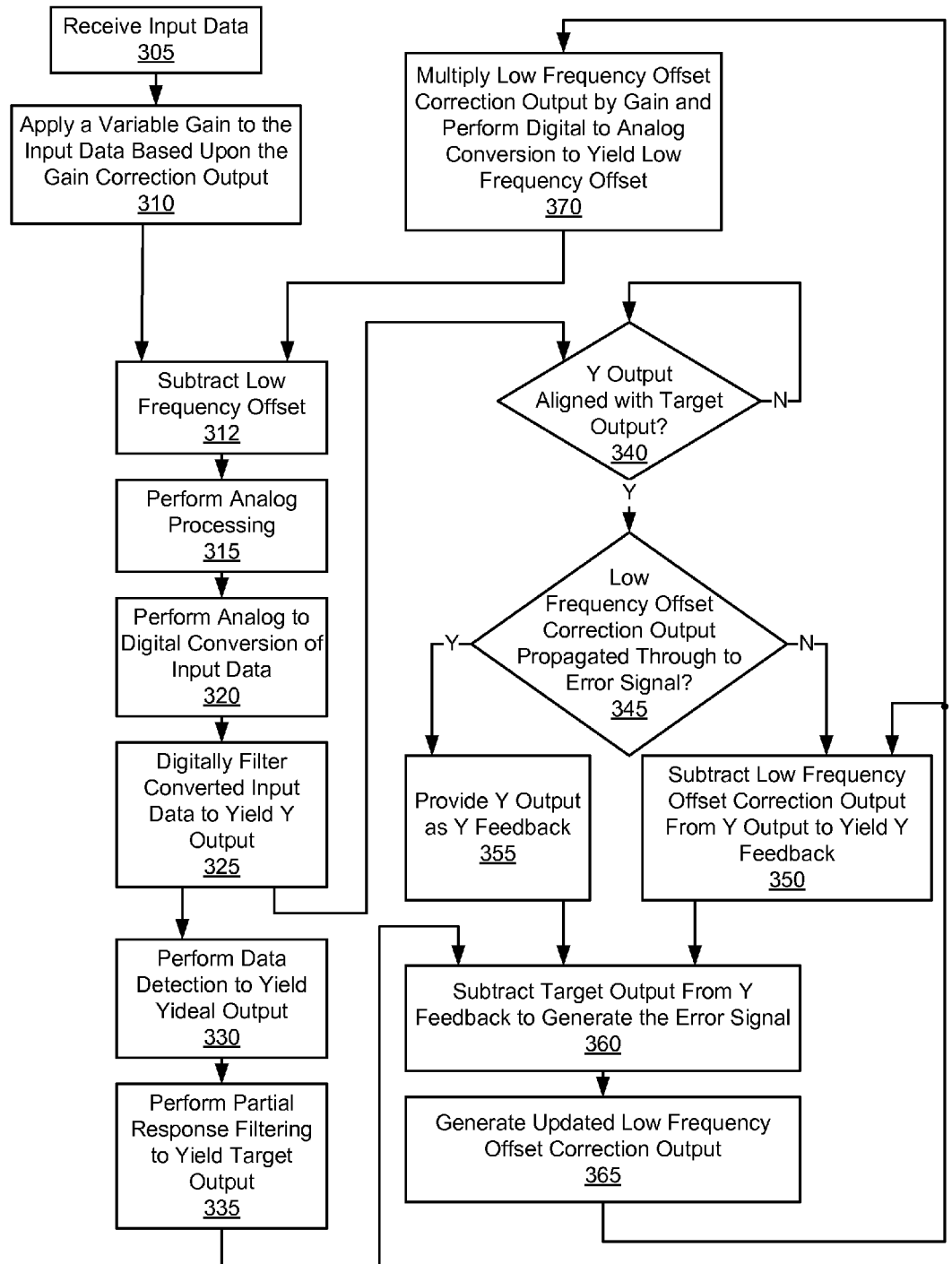
FIG. 3 is a flow diagram showing a method for reducing low frequency offset correction latency in a data detection system in accordance with one or more embodiments of the present invention.

Turning to FIG. 3, a flow diagram 300 shows a method for reducing low frequency offset correction latency in a data detection system in accordance with one or more embodiments of the present invention. Following flow diagram 300, a data input is received (block 305). This data input may be, for example, an analog input signal derived from a magnetic storage medium. A variable gain amplification is performed on the data input (block 310). In some cases, the variable amplification is done using an analog variable gain amplifier. The variable gain amplification provides a variably amplified output. A low frequency offset is subtracted from the variably amplified output (block 312), and analog processing is applied to the resulting processed output (block 315). This analog processing may include, but is not limited to, a continuous time filtering process and/or magneto-resistive asymmetry correction as is known in the art. The analog processed output is then converted to one or more digital samples through an analog to digital conversion process (block 320).

The resulting digital samples are digitally filtered to yield a Y output (block 325). In some cases, the digital filtering is done using a digital finite impulse response filter as are known in the art. A data detection process is performed on the Y output to generate a $Y_{ideal}$ output (block 330). The data detection process may be performed using any data detector/decoder known in the art. In addition, a partial response filtering is applied to the $Y_{ideal}$ output to yield a target output (block 335). In some cases, the partial response filtering is done using a digital finite impulse response filter where the taps of the filter are coupled to a target set as is known in the art.

The Y output is delayed in time to align it with the target output (block 340). Once the Y output aligns with the target output (or will align after a multiplication process) (block 340), it is determined whether the current low frequency offset correction output has propagated through the generation of a feedback error signal (block 345). Where the current low frequency offset correction output has not yet propagated back through to the generation of the feedback error signal (block 345), the low frequency offset correction output is subtracted from the Y output to yield a Y feedback value (block 350). Otherwise, where the current low frequency offset correction output has propagated back through to the generation of the feedback error signal (block 345), the Y output is passed through as the Y feedback signal (block 355). In both cases, the target output (from block 335) is subtracted from the Y feedback signal to update the low frequency offset correction output (block 360). This low frequency offset correction output (block 365) is multiplied by a gain factor and the product is converted to an analog low frequency offset signal (block 370). This analog low frequency offset signal is used in the subtraction of block 312. The gain factor is selected such that the loop gain for the low frequency correction loop is unity.

Figure 4:
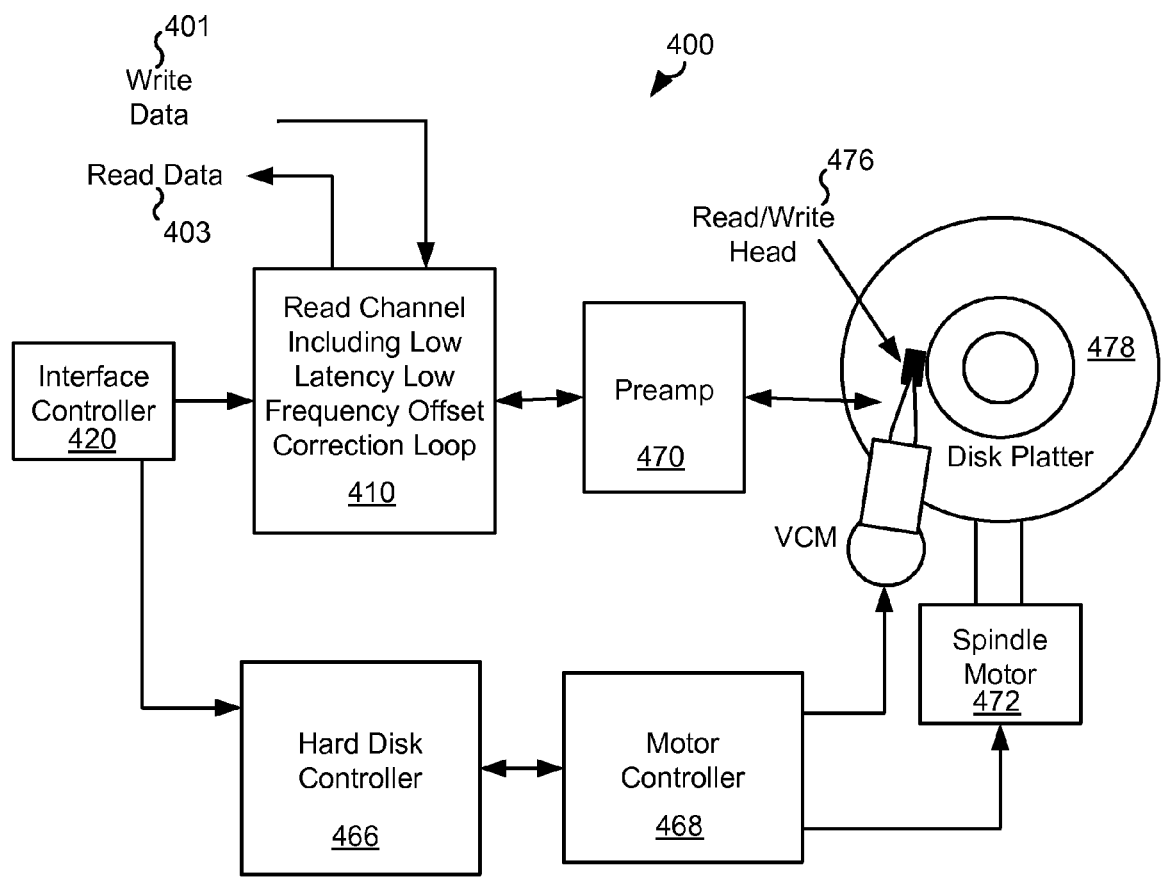
FIG. 4 shows a storage system including a reduced latency low frequency offset correction loop circuit in accordance with some embodiments of the present invention.

Turning to FIG. 4, a storage system 400 including a read channel 410 with low latency loop recovery is shown in accordance with various embodiments of the present invention. Storage system 400 may be, for example, a hard disk drive. The low latency loop recovery includes a data detector that may be any data detector known in the art including, for example, a Viterbi algorithm data detector. Storage system 400 also includes a preamplifier 470, an interface controller 420, a hard disk controller 466, a motor controller 468, a spindle motor 472, a disk platter 478, and a read/write head 476. Interface controller 420 controls addressing and timing of data to/from disk platter 478. The data on disk platter 478 consists of groups of magnetic signals that may be detected by read/write head assembly 476 when the assembly is properly positioned over disk platter 478. In one embodiment, disk platter 478 includes magnetic signals recorded in accordance with either a longitudinal or a perpendicular recording scheme.

In a typical read operation, read/write head assembly 476 is accurately positioned by motor controller 468 over a desired data track on disk platter 478. Motor controller 468 both positions read/write head assembly 476 in relation to disk platter 478 and drives spindle motor 472 by moving read/write head assembly to the proper data track on disk platter 478 under the direction of hard disk controller 466. Spindle motor 472 spins disk platter 478 at a determined spin rate (RPMs). Once read/write head assembly 478 is positioned adjacent the proper data track, magnetic signals representing data on disk platter 478 are sensed by read/write head assembly 476 as disk platter 478 is rotated by spindle motor 472. The sensed magnetic signals are provided as a continuous, minute analog signal representative of the magnetic data on disk platter 478. This minute analog signal is transferred from read/write head assembly 476 to read channel module 464 via preamplifier 470. Preamplifier 470 is operable to amplify the minute analog signals accessed from disk platter 478. In turn, read channel module 410 decodes and digitizes the received analog signal to recreate the information originally written to disk platter 478. This data is provided as read data 403 to a receiving circuit. As part of decoding the received information, read channel 410 performs a variable gain amplification based on a gain adjustment feedback circuit. The gain adjustment feedback circuit includes both a master loop and a slave loop. In some cases, read channel 410 includes circuitry similar to that discussed above in relation to FIG. 2. In some cases, gain adjustment process is performed in accordance with that discussed above in relation to FIG. 3. A write operation is substantially the opposite of the preceding read operation with write data 401 being provided to read channel module 410. This data is then encoded and written to disk platter 478.

In conclusion, the invention provides novel systems, devices, methods and arrangements for performing data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A storage device, the storage device comprising:
a storage medium;
a read/write head assembly, wherein the read/write head assembly is operable to access information stored on the storage medium and to transfer the information to an analog processing circuit, and wherein the analog processing circuit includes:
a summation circuit, wherein the summation circuit is operable to subtract a low frequency offset feedback from a derivative of the information to yield a processing output;
an analog to digital converter, wherein the analog to digital converter is operable to convert a derivative of the processing output to a series of digital samples;
a digital processing circuit, wherein the digital processing circuit includes:
a data detector circuit, wherein the data detector circuit is operable to apply a data detection algorithm to a derivative of the series of digital samples and to provide an ideal output;
an error feedback circuit, wherein the error feedback circuit includes a conditional subtraction circuit that is operable to conditionally subtract an interim low frequency offset correction signal from a delayed version of the derivative of the series of digital samples to yield an interim factor;
an error calculation circuit, wherein the error calculation circuit is operable to generate an interim low frequency offset correction signal based at least in part on the interim factor and a derivative of the ideal output; and
a digital to analog converter, wherein the digital to analog converter is operable to convert a derivative of the interim low frequency offset correction signal to yield the low frequency offset feedback.

2. The storage device of claim 1, wherein the analog processing circuit further includes a magneto-resistive asymmetry correction circuit and a filter, wherein the magneto-resistive asymmetry correction circuit is operable to receive the processing output and to provided a corrected output, and wherein the filter receives the corrected output and provides the derivative of the processing output.

3. The storage device of claim 1, wherein the digital processing circuit further includes a digital filter, and wherein the digital filter is operable to receive the series of digital samples and provides the derivative of the series of digital samples.

4. The storage device of claim 1, wherein the summation circuit is a first summation circuit, and wherein the conditional subtraction circuit includes:
a delay circuit, wherein the delay circuit is operable to provide a delayed version of the interim low frequency offset correction signal; and
a second summation circuit, wherein the second summation circuit is operable to subtract the delayed version of the interim low frequency offset correction signal from the interim low frequency offset correction signal to yield a compensation factor.

5. The storage device of claim 4, wherein the delay circuit is a first delay circuit, and wherein the conditional subtraction circuit further includes:
a second delay circuit, wherein the second delay circuit is operable to receive the derivative of the series of digital samples and to provide the delayed version of the derivative of the series of digital samples; and
a third summation circuit, wherein the third summation circuit is operable to subtract the compensation factor from the delayed version of the interim low frequency offset correction signal to yield the interim factor.

6. The storage device of claim 1, wherein the summation circuit is a first summation circuit, wherein the error calculation circuit includes:
a second summation circuit, wherein the second summation circuit is operable to subtract the derivative of the ideal output from the interim factor to yield the interim low frequency offset correction signal.

7. The storage device of claim 1, wherein the digital processing circuit further includes a multiplication circuit, and wherein the multiplication circuit is operable to multiply the interim low frequency offset correction signal by a gain factor to yield the derivative of the interim low frequency offset correction signal.

8. The storage device of claim 7, wherein the gain factor yields a loop gain of unity.

9. The storage device of claim 1, wherein the error calculation circuit includes:
a partial response target circuit, wherein the partial response target circuit is operable to receive the ideal output and to yield the derivative of the ideal output.

10. A data processing circuit, the circuit comprising:
a summation circuit, wherein the summation circuit is operable to subtract a low frequency offset feedback from an input signal to yield a processing output;
a data detector circuit, wherein the data detector circuit is operable to apply a data detection algorithm to a derivative of the processing output and to provide an ideal output;
an error feedback circuit, wherein the error feedback circuit includes a conditional subtraction circuit that is operable to conditionally subtract an interim low frequency offset correction signal from a delayed version of the derivative of the processing output to yield an interim factor;
an error calculation circuit, wherein the error calculation circuit is operable to generate an interim low frequency offset correction signal based at least in part on the interim factor and a derivative of the ideal output; and
wherein the low frequency offset feedback is derived from the interim low frequency offset correction signal.

11. The circuit of claim 10, wherein the derivative of the processing output is a first derivative of the processing output, and wherein the circuit further comprises:
an analog to digital converter, wherein the analog to digital converter is operable to convert a second derivative of the processing output to yield the first derivative of the processing output; and
a digital to analog converter, wherein the digital to analog converter is operable to convert a derivative of the interim low frequency offset correction signal to yield the low frequency offset feedback.

12. The circuit of claim 11, wherein the circuit further comprises:
a multiplication circuit, and wherein the multiplication circuit is operable to multiply the interim low frequency offset correction signal by a gain factor to yield the derivative of the interim low frequency offset correction signal.

13. The circuit of claim 11, wherein the circuit further comprises:
- a variable gain amplifier, wherein the variable gain amplifier is operable to receive information derived from a storage medium and to provide the input signal;
- a magneto-resistive asymmetry correction circuit, wherein the magneto-resistive asymmetry correction circuit is operable to receive the processing output and to provide a corrected output; and
- a filter, wherein the filter is operable to receive the corrected output and to provide the second derivative of the processing output.

14. The circuit of claim 10, wherein the derivative of the processing output is a first derivative of the processing output, and wherein the circuit further comprises:
- a filter, wherein the filter is operable to receive a second derivative of the processing output and to provide the first derivative of the processing output.

15. The circuit of claim 10, wherein the summation circuit is a first summation circuit, and wherein the conditional subtraction circuit includes:
- a delay circuit, wherein the delay circuit is operable to provide a delayed version of the interim low frequency offset correction signal; and
- a second summation circuit, wherein the second summation circuit is operable to subtract the delayed version of the interim low frequency offset correction signal from the interim low frequency offset correction signal to yield a compensation factor.

16. The circuit of claim 15, wherein the delay circuit is a first delay circuit, and wherein the conditional subtraction circuit further includes:
- a second delay circuit, wherein the second delay circuit is operable to receive the derivative of the series of digital samples and to provide the delayed version of the derivative of the series of digital samples; and
- a third summation circuit, wherein the third summation circuit is operable to subtract the compensation factor from the delayed version of the interim low frequency offset correction signal to yield the interim factor.

17. The circuit of claim 10, wherein the summation circuit is a first summation circuit, and wherein the error calculation circuit includes:
- a second summation circuit, wherein the second summation circuit is operable to subtract the derivative of the ideal output from the interim factor to yield the interim low frequency offset correction signal.

18. The circuit of claim 10, wherein the error calculation circuit includes:
- a partial response target circuit, wherein the partial response target circuit is operable to receive the ideal output and to yield the derivative of the ideal output.

19. A method for reduced latency data processing, the method comprising:
- providing a summation circuit;
- subtracting a low frequency offset feedback from an input signal to yield a processing output;
- applying a data detection algorithm to a derivative of the processing output to yield an ideal output;
- performing a conditional subtraction, wherein an interim low frequency offset correction signal is subtracted from the derivative of the processing output to yield an interim factor during a limited period after the interim low frequency offset correction signal becomes available;
- subtracting a derivative of the ideal output from the interim factor to yield the interim low frequency offset correction signal, wherein the low frequency offset feedback is a derivative of the interim low frequency offset correction signal; and
- multiplying the interim low frequency offset correction signal by a gain factor to yield the derivative of the interim low frequency offset correction signal.

20. The method of claim 19, wherein the derivative of the processing output is a first derivative of the processing output, and wherein the method further comprises:
- performing an analog to digital conversion of a second derivative of the processing output to yield the first derivative of the processing output; and
- performing a digital to analog conversion of the derivative of the interim low frequency offset correction signal to yield the low frequency offset feedback.

* * * * *